US007133598B1

(12) United States Patent
Lin et al.

(10) Patent No.: US 7,133,598 B1
(45) Date of Patent: Nov. 7, 2006

(54) METHOD FOR CONVERTING PACKETIZED VIDEO DATA AND CORRESPONDING NAVIGATION DATA INTO A SECOND DATA FORMAT

(75) Inventors: Shu Lin, Indianapolis, IN (US); Donald Henry Willis, Indianapolis, IN (US); Mark Alan Schultz, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/378,669

(22) Filed: Aug. 20, 1999

(51) Int. Cl.
H04N 7/26 (2006.01)
(52) U.S. Cl. .................. 386/109; 386/125; 386/109
(58) Field of Classification Search ............. 356/34, 356/45, 95, 48, 111–112, 125–126
See application file for complete search history.

(56) References Cited

U.S. PATENT DOCUMENTS

| 5,276,665 | A | * | 1/1994 | Aoki et al. | 369/53.2 |
| 5,502,494 | A | | 3/1996 | Auld | 348/426 |
| 5,559,999 | A | | 9/1996 | Maturi et al. | 395/550 |
| 5,619,337 | A | * | 4/1997 | Naimpally | 386/83 |
| 5,621,840 | A | | 4/1997 | Kawamura et al. | 386/68 |
| 5,729,648 | A | | 3/1998 | Boyce et al. | 386/68 |
| 5,745,643 | A | * | 4/1998 | Mishina | 386/106 |
| 5,801,781 | A | * | 9/1998 | Hiroshima et al. | 348/441 |
| 5,818,533 | A | | 10/1998 | Auld et al. | 348/412 |
| 5,832,085 | A | * | 11/1998 | Inoue et al. | 386/124 |
| 5,835,636 | A | | 11/1998 | Auld | 382/233 |
| 5,870,523 | A | | 2/1999 | Kikuchi et al. | 386/95 |
| 5,902,115 | A | | 5/1999 | Katayama | 434/307 |
| 5,929,857 | A | | 7/1999 | Dinallo et al. | 345/354 |
| 5,960,006 | A | | 9/1999 | Maturi et al. | 370/509 |
| 6,160,952 | A | * | 12/2000 | Mimura et al. | 386/95 |
| 6,173,113 | B1 | * | 1/2001 | Okada et al. | 386/95 |
| 6,370,322 | B1 | * | 4/2002 | Horiguchi et al. | 386/95 |
| 6,381,398 | B1 | * | 4/2002 | Yamauchi et al. | 386/52 |
| 6,385,389 | B1 | * | 5/2002 | Maruyama et al. | 386/95 |
| 6,434,326 | B1 | * | 8/2002 | Kondo et al. | 386/125 |
| 6,504,996 | B1 | * | 1/2003 | Na et al. | 386/125 |

FOREIGN PATENT DOCUMENTS

| EP | 0724264 | 7/1996 |
| EP | 0797204 A2 | 9/1997 |
| EP | 0942426 A2 | 9/1999 |
| EP | 0986062 A1 | 3/2000 |
| EP | 1039468 A2 | 9/2000 |

* cited by examiner

OTHER PUBLICATIONS

PCT Search Report.

Primary Examiner—James J. Groody
Assistant Examiner—James A. Fletcher
(74) Attorney, Agent, or Firm—Joseph J. Laks; Ronald H. Kurdyla; Joel M. Fogelson

(57) ABSTRACT

A video processing system adaptively generates and processes volume/file structure and navigation data of different data format and converts data between different formats for decoding, recording and other applications. The system processes the volume/file structure and navigation data in distinct modes including (a) pre-processing, (b) contemporaneous and (c) post-processing modes. In addition, the system provides navigation information supporting navigation through different images of one or more video programs by parsing encoded packetized data representative of a sequence of individual images to determine parameters to support navigation through the sequence of individual images. The determined parameters are formatted into a predetermined data structure and incorporated into a pre-formed navigation data field.

10 Claims, 9 Drawing Sheets

| Ref | PARAMETERS/TABLES/MAPS | PRE-PROCESSING (633) | DURING RECORDING (637) | POST-PROCESSING (639) | READ ONLY FORMAT DATA ITEM (FIGURE2) (640) | GENERIC FORMAT DATA ITEM (FIGURE1) (645) |
|---|---|---|---|---|---|---|
| 650 | MENU | Y | C | U | 209, 217 | 409, 418 |
| 652 | LANGUAGES | - | I | MULTIPLE | 209, 217 | 409, 418 |
| 655 | PROGRAM CHAIN INFORMATION IN MENU DOMAIN | Y | C | U | 209, 217 | 409, 418 |
| 657 | NUMBER OF VIDEO OBJECTS IN VIDEO TITLE SET MENU | - | I | U | 217 | 424 |
| 659 | CONTENT RATINGS | O | O | O | 207 | 411-424 |
| 663 | NUMBER OF VIDEO TITLE SET | | X | U | 200 | 409 |
| 665 | NUMBER OF TITLE SEARCH POINTER | | X | U | 207 | 409, 418 |
| 667 | BIT 7 OF THE BYTE TITLE PLAY BACK | | ZERO | ONE | 207 | 409, 418 |
| 669 | NAVIGATION COMMANDS IN MENU | | R | U | 209, 217 | 427 |
| 672 | NAVIGATION INFORMATION IN VIDEO OBJECT UNIT | | R | U | 272 | 427 |
| 675 | FORWARD ADDRESSES IN VIDEO OBJECT UNIT | | | U | 272 | |
| 677 | FILES IN FILE STRUCTURE | | O | U | 191 | 403 |
| 679 | VIDEO MANAGER INFORMATION MANAGEMENT TABLE | O | O | U | 207 | 409, 414, 418 |
| 682 | TITLE SEARCH POINTER TABLE | O | R | U | 207 | 409, 414, 418 |
| 686 | VIDEO MANAGEMENT INFORMATION TABLE | | | | | |
| 689 | TEXT DATA MANAGER | | O | O | 207 | 409, 414, 418 |
| 691 | VIDEO MANAGER MENU CELL ADDRESS TABLE | | R | U | 207 | 409, 414, 418 |
| 693 | VIDEO TITLE SET ATTRIBUTE SEARCH POINTER | | R | U | 207 | 409, 414, 418 |
| 695 | VIDEO TITLE SET ATTRIBUTE | | R | U | 207 | 409, 414, 418 |
| 697 | VIDEO OBJECT UNIT ADDRESS TABLE | O | | U | 207, 213 | 409, 411 |

O: OPTIONAL.    R: RECORD AND INSERT DUMMY DATA FOR UNKNOWN INFORMATION.    U: UPDATE, AND REPLACE DUMMY DATA WITH RIGHT INFORMATION.
X: INSERT THE CORRECT INFORMATION, THIS DATA IS TO BE CHECKED DURING UPDATING;    Y: INFORMATION IS KNOWN BUT MAY ALSO BE UPDATED LATER.
C: COPY EXISTING DATA ONTO DISC.    MULTIPLE: COULD BE MORE THAN 1.

FIG. 3A (A) NO VISIBLE BUTTON (B) BUTTON 1 IS ADDED (C) SIX BUTTONS ARE ADDED

METHOD FOR CONVERTING PACKETIZED VIDEO DATA AND CORRESPONDING NAVIGATION DATA INTO A SECOND DATA FORMAT

FIELD OF THE INVENTION

This invention is related to the field of digital signal processing, recording and retrieval of video and audio data for storage or display applications, for example.

BACKGROUND OF THE INVENTION

In digital video processing and storage applications, packetized video data is typically encoded with ancillary information for use in locating, decoding and navigating through encoded image data. In a Digital Video Disk (DVD) type application, ancillary data in the form of volume/file structure data and navigation data contains information for use in locating data and navigating through different image sequences. Volume/file structure information uses one or more file directories in defining file structures for use in locating and recovering data from a storage medium, for example. Navigation data additionally locates and links sections of video/audio program data for use in navigating through image sequence in different modes of operation, for example. In normal program play mode a first sequence of images is located, linked and processed for play by a DVD player and in another mode a different sequence of images is processed to provide a different scene or camera angle, for example. However, such ancillary file structure and navigation information may be encoded in different data formats in accordance with different encoding standards and applications. A program encoded with file structure and navigation data according to one standard for read-only DVD applications may be incompatible with the navigation data structure and content requirements of a different standard such as a recordable DVD format, for example. As a result a recordable format DVD disk may not be playable by a read-only DVD player or a program encoded for read-only DVD format may not be directly stored by a recordable DVD player, and vice versa.

In addition, the content and format of existing file structure and navigation data structures for DVD and other applications are limited and do not adequately support advanced decoder navigation features for multimedia and other applications. Advanced decoder navigation features include, for example, trick play operation (such as reverse, fast forward, freeze-frame etc.), image manipulation (involving linking images out of sequence and from different programs), and navigation in a multi-windowed composite image display containing different video programs or other multimedia application images. Such multimedia picture-in-picture (PIP) type images may comprise, for example, Internet web pages, electronic program guides, Email, telephone, fax, video-phone, home appliance control images as well as video program images. These deficiencies and derivative deficiencies are addressed by a system according to the present invention. Specifically, a system according to the invention addresses the problems involved in generating, processing and formatting ancillary volume/file structure and navigation data to be compatible with different data encoding standards and to support advanced multimedia navigation features.

SUMMARY OF THE INVENTION

A video processing system adaptively generates and processes volume/file structure and navigation data of different data format and converts data between different formats for decoding, recording and other applications. The system provides navigation information supporting navigation through different images of one or more video programs by parsing encoded packetized data representative of a sequence of individual images to determine parameters to support navigation through the sequence of individual images. The determined parameters are formatted into a predetermined data structure and incorporated into a pre-formed navigation data field.

BRIEF DESCRIPTION OF THE DRAWINGS

In the drawing:

FIGS. 3A and 3B show a table listing read-only DVD format data structure items (indicated in FIG. 2) that are processed in pre-processing, contemporaneous and post-processing modes for incorporation in the generic DVD data format of FIG. 1, according to the invention.

DETAILED DESCRIPTION

Figure 1:
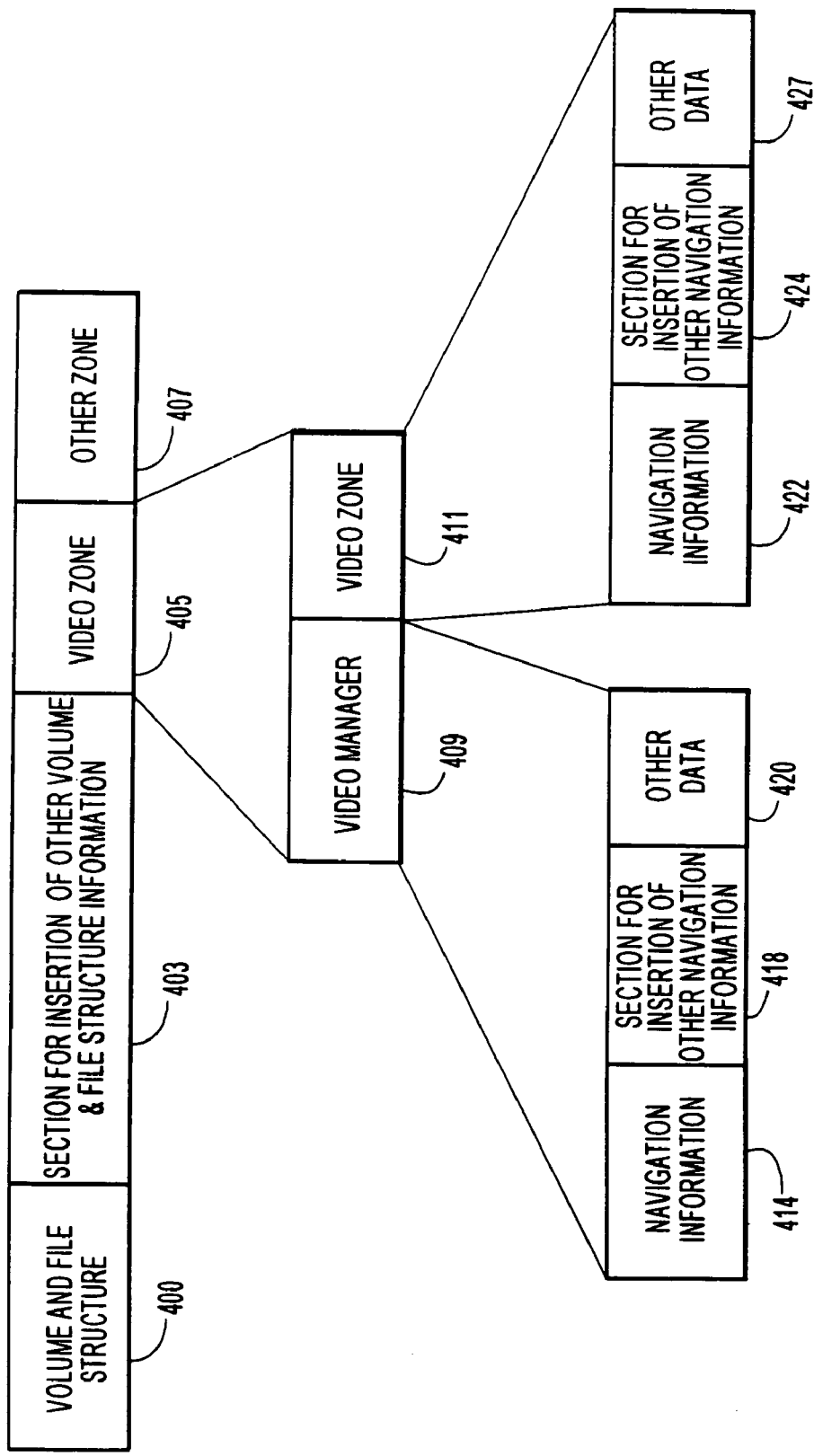
FIG. 1 shows an exemplary top level generic DVD data format compatible with recordable and read-only DVD players, according to the invention.

A video processing system advantageously adaptively generates and processes volume/file structure and navigation data of different data format and converts data between different formats for decoding, recording and other applications. The principles of the invention may be applied to processing and storage of terrestrial, cable, satellite, Internet or computer network broadcast data. Further, although the disclosed system is described as processing video programs, this is exemplary only. The term 'program' is used to represent any form of packetized data such as audio data, telephone messages, computer programs, Internet web pages or other communications, for example.

The processing system is discussed in the context of processing and converting data of different data format, specifically in processing and converting between recordable and read-only formats for a DVD type application and vice versa. However, this is exemplary only, the principles of the invention may also be applied to the processing and conversion of other data formats. Other formats may include, for example, proprietary and custom formats, MPEG format (including data encoded to the MPEG-4 or MPEG-7 standards) and non-MPEG compatible formats. Note, the read-only DVD data format employs a sub-set of the MPEG2 format and is defined by a proprietary standard adopted by a consortium of consumer electronics companies and described in available literature such as "DVD Demystified-The Guidebook of DVD-Video and DVD-ROM", 1997, by Jim Taylor published by McGraw Hill. Further, MPEG2 compatible data is encoded in accordance with the "MPEG standard" comprised of a system encoding section (ISO/IEC 13818-1, 10th Jun. 1994) and a video encoding section (ISO/IEC 13818-2, 20th Jan. 1995).

A program encoded with file structure and navigation data according to a recordable DVD standard may be incompatible with the file structure and navigation data requirements of a program encoded to a different standard such as a read-only DVD format, for example. As a result a recordable DVD disk may not be playable by a read-only DVD player or a program encoded for read-only DVD format may not be directly stored by a recordable DVD player, and vice versa. Such data format incompatibility may arise between other different data formats. Data format incompatibility may also arise between data encoded in different versions of a single format such as between different versions of a recordable DVD format. The resulting lack of backward compatibility means a recorded disk may not be playable on different generations of player, for example.

A processing system, according to the invention, adaptively generates and processes file structure and navigation data of different data format. The processing system also converts file structure and navigation data between different formats for decoding, recording and other applications. In a specific embodiment, a processing system encodes a video program into a generic data format (as exemplified in FIG. 1) that is compatible with recordable and read-only video processing devices.

A number of difficulties are involved in processing a program in a recordable data format for play by a read-only format player. Specifically, a program encoded in a read-only format (as exemplified by FIG. 2) contains file structure and navigation data to support several navigation features. Such features include, the location of individual programs in a set of programs, the navigation through different image sequences to provide different scenes or camera angles, and trick play operation (such as reverse, fast forward, freeze-frame etc.) for example. The read-only format file structure and navigation data supporting such navigation features is derived and stored in a disk-mastering operation as part of a manufacturing process where there are no real time processing constraints. In contrast, deriving such file structure and navigation data for home recording imposes a significant burden on a recording device.

A processing system, according to the invention, minimizes the burden of generating such file structure and navigation data by advantageously adaptively generating and processing data in distinct modes. These modes comprise, (a) pre-processing, (b) contemporaneous and (c) post-processing modes. The pre-processing mode precedes a program recording or format conversion operation. The contemporaneous mode occurs during a program recording or format conversion operation. Further, the pre-processing and contemporaneous modes may each involve creating pre-formed data fields for subsequent insertion of file structure and navigation parameters. The post-processing mode occurs after program recording or format conversion and involves inserting file structure or navigation parameters in the pre-formed data fields.

A processing system encodes a video program into a generic data format (as exemplified in FIG. 1) that is compatible with read-only format (as exemplified in FIG. 2) and recordable format video processing devices. The following discussion describes the generic data format of FIG. 1 and read-only format of FIG. 2. The subsequent discussion in connection with FIGS. 3A and 3B describes the processing of read-only DVD format data items of FIG. 2 in pre-processing, contemporaneous and post-processing modes for incorporation in the generic DVD data format of FIG. 1.

FIG. 1 shows an exemplary top level generic DVD data format compatible with recordable and read-only DVD players. The highest level of the hierarchical generic data format comprises volume and file structure section 400 defining file locations and paths and section 403 for insertion of other volume or file structure information. The highest level also includes video zone 405 including program video content and program guide/menu content and other zone 407 for ancillary and other data. Video zone 405 comprises video manager 409 and video zone 411. Further video manager 409 is hierarchically comprised of navigation information 414 and data-section 418 for insertion of navigation information and other data in section 420. Video Zone 411 is comprised of navigation information 422 and data section 424 for insertion of navigation information generated in post-processing mode and other data in section 427.

The file structure and navigation parameters incorporated within the generic format of FIG. 1 support navigation through images in an MPEG compatible group of pictures (GOP) or within a DVD video object unit (VOBU). The parameters also support navigation within a single program or between different programs including audio programs, Internet web page data, text data, and program guides and between images of different MPEG elementary streams. Specifically, navigation parameters may include, for example, parameters identifying individual GOPs, or the number of GOPs in a video object unit (VOBU), or image data location information.

Further, such location information may include data, identifying the size of image representative data, or identifying MPEG reference frames in a VOBU or GOP, or identifying image representative data start or end addresses. In addition, the navigation parameters may also include trick play mode selection information.

Figure 2:
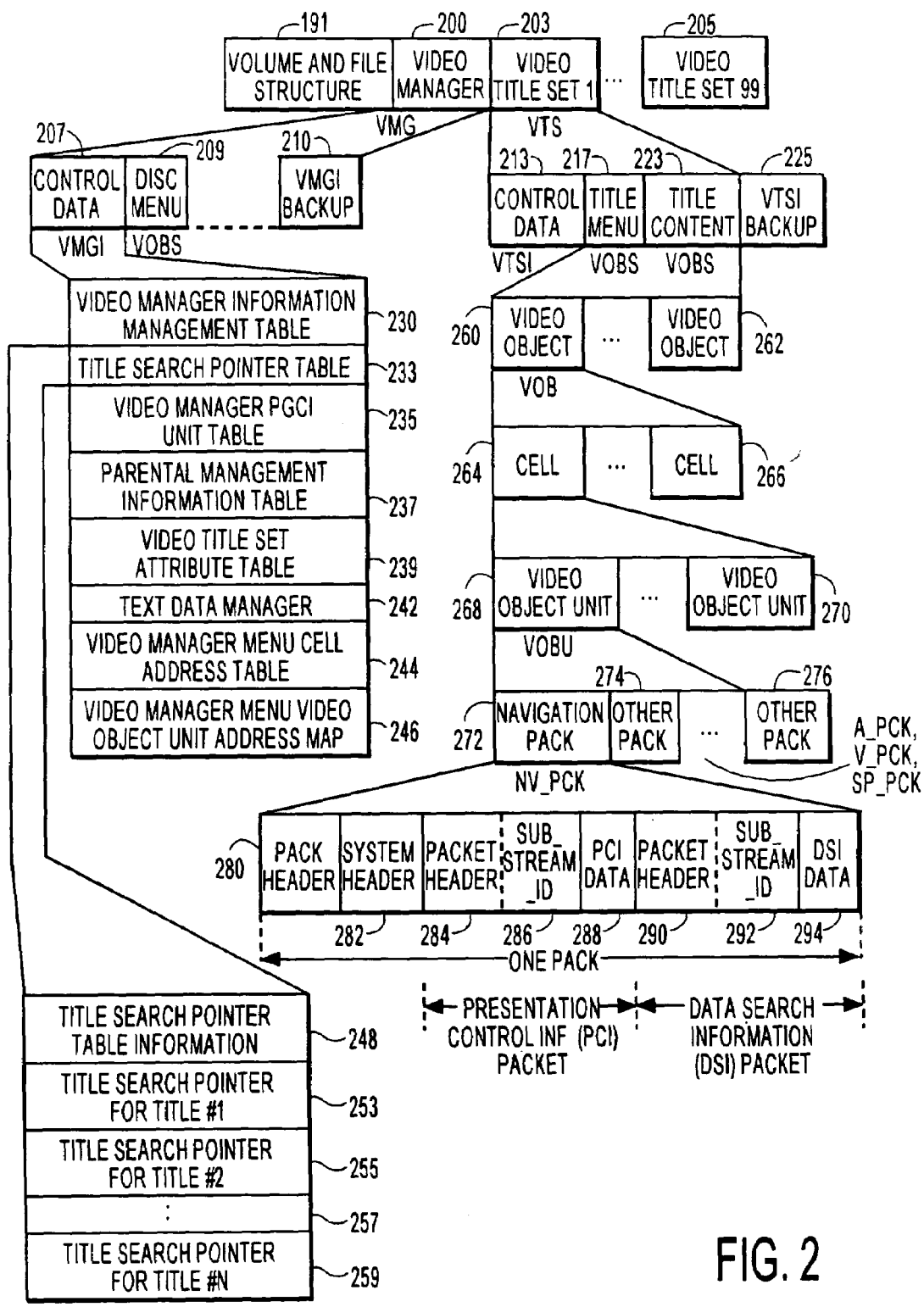
FIG. 2 shows a read-only DVD data format indicating volume/file structure and video program navigation information.

FIG. 2 shows a read-only DVD hierarchical data format indicating location and structure of navigation information used in decoding and navigating through video program image sequences for different modes of operation. The highest level of the hierarchical read-only data format comprises, volume and file structure data 191, a video manager section (VMG) 200 and video title (program) sets (VTS) 203–205 including video program content. Each VTS is hierarchically associated with: video title set information VTSI 213 for one or more video programs (titles); program menu information 217; program content information 223 and back-up VTSI data 225. Further, program menu information 217 and program content information 223 are comprised of video objects (VOB) 260–262 and an individual VOB (e.g. VOB 260) is comprised of cells 264–266. An individual cell, e.g. cell 264, represents program data of duration that is variable from 1 second to the length an entire movie, for example. Cell 264 is comprised of video object units (VOBU) 268–270 and each video object unit represents 0.4–1.2 seconds of video program play. Each individual video object unit (exemplified by units 272, 274–276) may include navigation pack information together with video, audio and sub-picture data (comprising captions, and ancillary text, for example). An individual navigation pack includes headers, sub-stream_ids, presentation control information (PCI) data, and data search information (DSI) as shown in units 280–294.

Figure 3B:
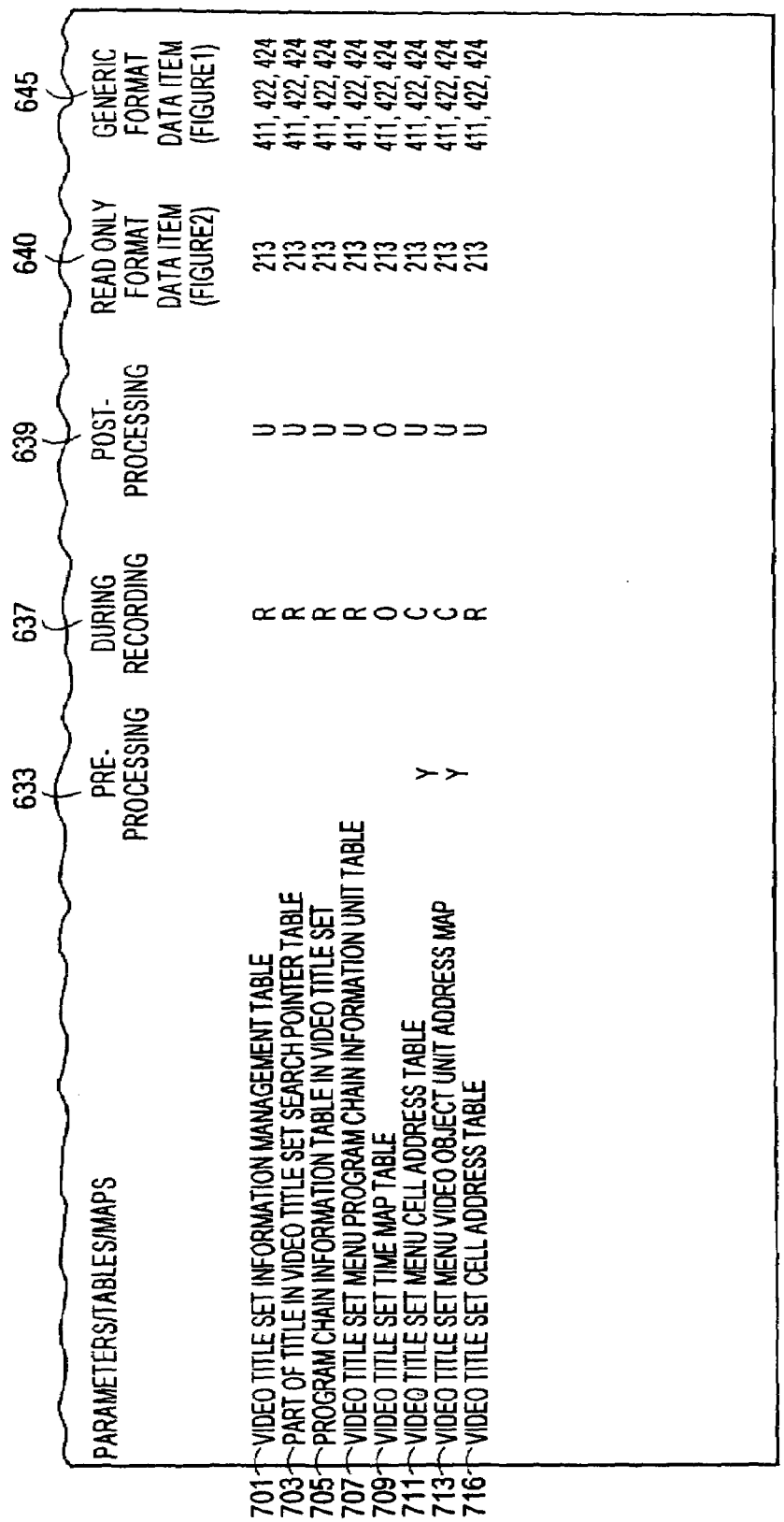

The main menu of a DVD disc in video manager section (VMG) 200 is optional. This main menu represents the first image a User sees on accessing a DVD disk. VMG 200 is hierarchically associated with video manager control data 207, disc menu 209 and video manager back-up information 210. Further, control data 207 comprises: information management table 230; title search pointer table 233; menu program chain information unit table 235; parental management information table 237; video title set attribute table 239; text data manager 242; menu cell address table 244; and menu video object unit address map 246. Specifically, items 230–246 define size and start addresses of VMG information, attributes of video objects of the video manager menu, video program search information, menu language information, parental rating control information, duplicate video program attribute information, and program identification names (e.g. volume, album or producer names). Further, title search pointer table 233 includes search information items 253, 255, 257 and 259 each specifying program type, program number, number of camera angles, parental rating identifier and program start address, for example) for each program on a disk. Title search pointer table 233 also includes in item 248 parameters defining size and location of search pointer table 233 itself FIGS. 3A and 3B show a table listing read-only DVD format data structure items 650–716 (incorporated in the data structure of FIG. 2) that are processed in pre-processing, contemporaneous and post-processing modes for incorporation in the generic DVD data format of FIG. 1. Columns 633, 637 and 639 of FIGS. 3A and 3B indicate the nature of the processing action taken in conditioning data items 650–716 for inclusion in the generic data format of FIG. 1. Column 640 of FIGS. 3A and 3B identifies the individual data elements of FIG. 2 containing data items 650–716 and column 645 identifies the corresponding data elements of the generic format of FIG. 1 designated to incorporate the processed data items 650–716. The pre-processing, contemporaneous and post-processing actions listed in FIGS. 3A and 3B are described as follows.

1. Pre-Processing Mode

Pre-processing mode involves processing information that is obtainable prior to program recording. As part of pre-processing, a disk may be checked for usability, a file structure may be created and an audio track (either newly created or pre-existing) may be incorporated into pre-processed data. Specifically, in pre-processing mode, Video manager main menu 650 is created, a menu language 652 (e.g. English, French, German etc. as used in menus, text, etc.) is selected and program chain menu information 655 (i.e. information linking menu segments) is generated. Further, the number of video objects 657 in a video object set for a video manager menu is limited to 1 and both the size of the video object and its associated address are predefined. Content rating 659 (used for Parental management) is optional but may similarly be determined before recording. Further, in order to create a new video program (title) set menu (i.e. a menu of programs available on the disc), a standard pre-formed menu is used including title set menu cell address table 711 and video title set menu video object unit address map 713. In addition, other items may be optionally created during pre-processing mode including, information management table 679, text management information 689, menu cell address table 691 and video object unit address table 697.

Figure 10:
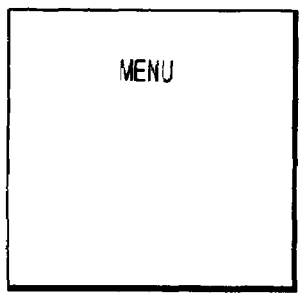
FIG. 10 shows an example of activation of buttons in a pre-formed menu, according to the invention.
Figure 10:
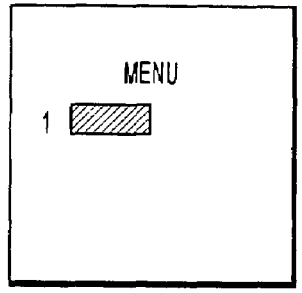
Figure 10:
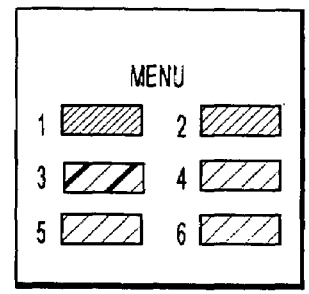

The pre-processing of data in the manner described herein advantageously simplifies and expedites the generation and processing of file structure and navigation data of different data format. The pre-processing and pre-forming of data elements prior to program recording or format conversion reduces the processing burden otherwise involved in performing these operations during recording or in post-processing. Such pre-processing may involve counting the number of individual I, P and B frames in an MPEG compatible GOP or in a VOBU, for example. Further, some pre-formed data elements are advantageously updated with new data during recording or post-processing mode. Other pre-formed data elements may be advantageously subsequently modified to accommodate newly available functions or features. For example, a menu may be generated before recording in the form of a stored bit map or may be embedded within software (e.g. in HTML). In one version, such a menu may be pre-formed to contain visible and invisible buttons. The invisible buttons are associated with inactive commands (e.g. no-operation NOP commands). A pre-formed menu containing invisible buttons is retrieved from memory and incorporated into video program data during program recording or to expand decoder features. The invisible menu buttons are subsequently activated by rendering the buttons visible and by replacing the dummy commands with active commands in response to a request to add a feature, for example. FIG. 10 shows an example of activation of buttons in a pre-formed menu. FIG. 10(a) shows the standard menu with no visible buttons and FIGS. 10(b) and 10(c) show the progressive activation of a single button and six buttons respectively. This capability supports the addition of a program (and an associated access pointer) that needs to be selectable by a User through a menu and supports other added User functions. In another version, a menu may be pre-formed to contain visible buttons associated with inactive commands and the menu may be subsequently activated by replacing the inactive commands with active commands. Similarly, the pre-processing described herein may advantageously be used to create whole new menus or an individual command item within an existing menu to flexibly accommodate data format conversion or new feature addition.

2. Contemporaneous Mode (Occurring During Program Recording).

Contemporaneous mode comprises processing that occurs during a program recording or format conversion operation. In contemporaneous mode, control indicators are updated upon addition of a new program (title) to a disk containing recorded program data. Specifically, the update of control indicators involves setting data type indicator 667 to zero and incrementing both the number of the video program set 663 and the number of title search pointers 665. Navigation information 669, 672 of unknown destination (e.g. involving commands such as link, jump, call instructions etc.) are recorded as dummy commands and updated in post-processing. Also, for a new video program set, a search pointer 693 and video attributes 695 are recorded with dummy data for update in post-processing.

In recording a new video program set, information items 701–716 are recorded and dummy data is incorporated for subsequent update in post-processing. In recording a new program, a program start address is added to management table 701 and a pointer is incorporated in pointer table 703. Further, program chain table 705 and unit table 707 are updated to include linking data for segments of the added program. Similarly, in time map table 709 containing program address links permitting random access for trick play and other navigation modes, time map link addresses may be updated, an associated index number is incremented and a search pointer is added. Unknown data is recorded as dummy data for update in post-processing. A new menu button permitting User selection of the added program is added in the video program set menu 650. In addition, associated navigation items are updated including menu program chain information 655 and navigation command data 669. The number of menu video objects 657 may also be updated to accommodate the new menu button if necessary.

In recording a new video object, new video title set cell information 711 is added, and the number of video objects and unknown data are recorded as dummy data. Program chain information 705 and menu program chain information unit table 707 are updated to reflect the new changed number of programs and cells. Note, items 705 and 707 contain data related to program control for a video tile set and its associated menu. Navigation commands (NextPGC, PreviousPGC, GoUp PGC, PG playback mode, and Still Time Value) are recorded as dummy commands (NOP) if the navigation destination is unknown at this stage. For a new cell, a cell number entry is added in the video title cell address table 716. In addition, video object units are stored in memory as complete units and are parsed prior to recording to determine video object unit level navigation information. Forward address links of sequentially linked video object units are unknown and are recorded as dummy data for update during post-processing.

3. Post-Processing Mode.

The post-processing mode occurs after program recording and involves updating dummy data in the file structure and navigation parameter data fields formed in the pre-processing and contemporaneous modes. Specifically, upon data format conversion, data type indicator 667 is changed from zero to one and existing video manager menu 650 may be replaced with a new version. Further, additional languages 652 are added if desired, and menu program chain information 655 and the number of video objects in the video manager menu 657 are updated with correct values. Similarly, content rating (Parental management) information 659 and text management information 689 are added or updated in this mode. The dummy data included for attribute search pointer 693 and for video program attributes 695 is replaced with correct information including a valid video program set attribute end address. Other data items 669–716 may similarly be updated or corrected in this mode if required.

Figure 4:
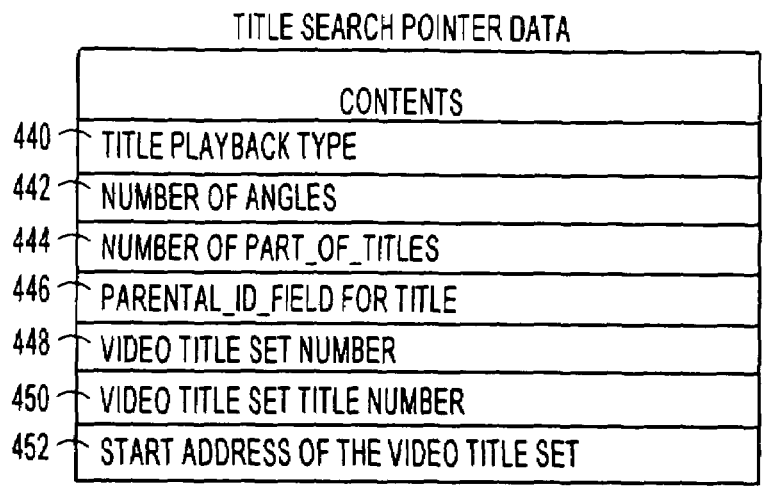
FIG. 4 shows an exemplary Title Search Pointer Data element of a generic DVD data format for inclusion of data type alteration information, according to the invention.

FIG. 4 shows an exemplary Title Search Pointer Data element of the generic DVD data format (FIG. 1) for inclusion of data type alteration information or information defining format type. The search pointer item 440 (Title playback type) is used to indicate a data format change from read-only to generic data format. However other definable parameters may also be used for indicating data format alteration or for defining a format type. Data items 442–452 provide camera angle, title, parental-id, and title set identifier parameters for use in decoding.

Figure 5:
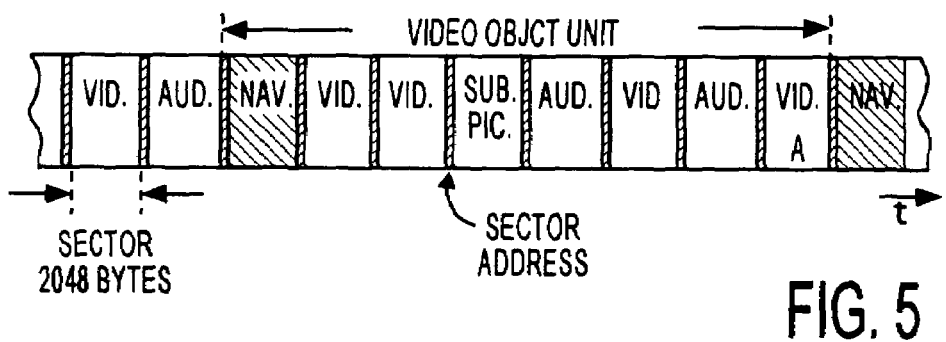
FIG. 5 depicts an exemplary recorded Video Object Unit (VOBU) including navigation, video, audio and sub-picture data.
Figure 6:
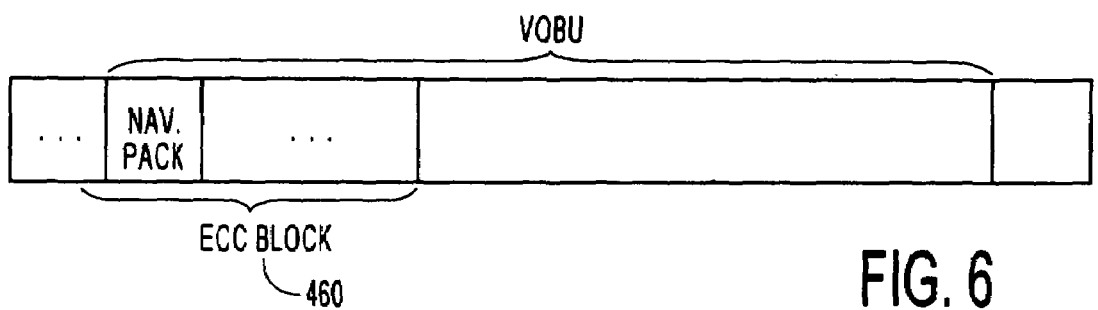
FIG. 6 depicts an Error Correction Coded (ECC) block within a Video Object Unit (VOBU).

FIGS. 5 and 6 show a time based data structure of recorded data in read-only format. FIG. 5 depicts an exemplary recorded read-only format Video Object Unit (VOBU) including navigation, video, audio and sub-picture data and sector addresses. FIG. 6 depicts an Error Correction Coded (ECC) block 460 within a Video Object Unit (VOBU).

Figure 7:
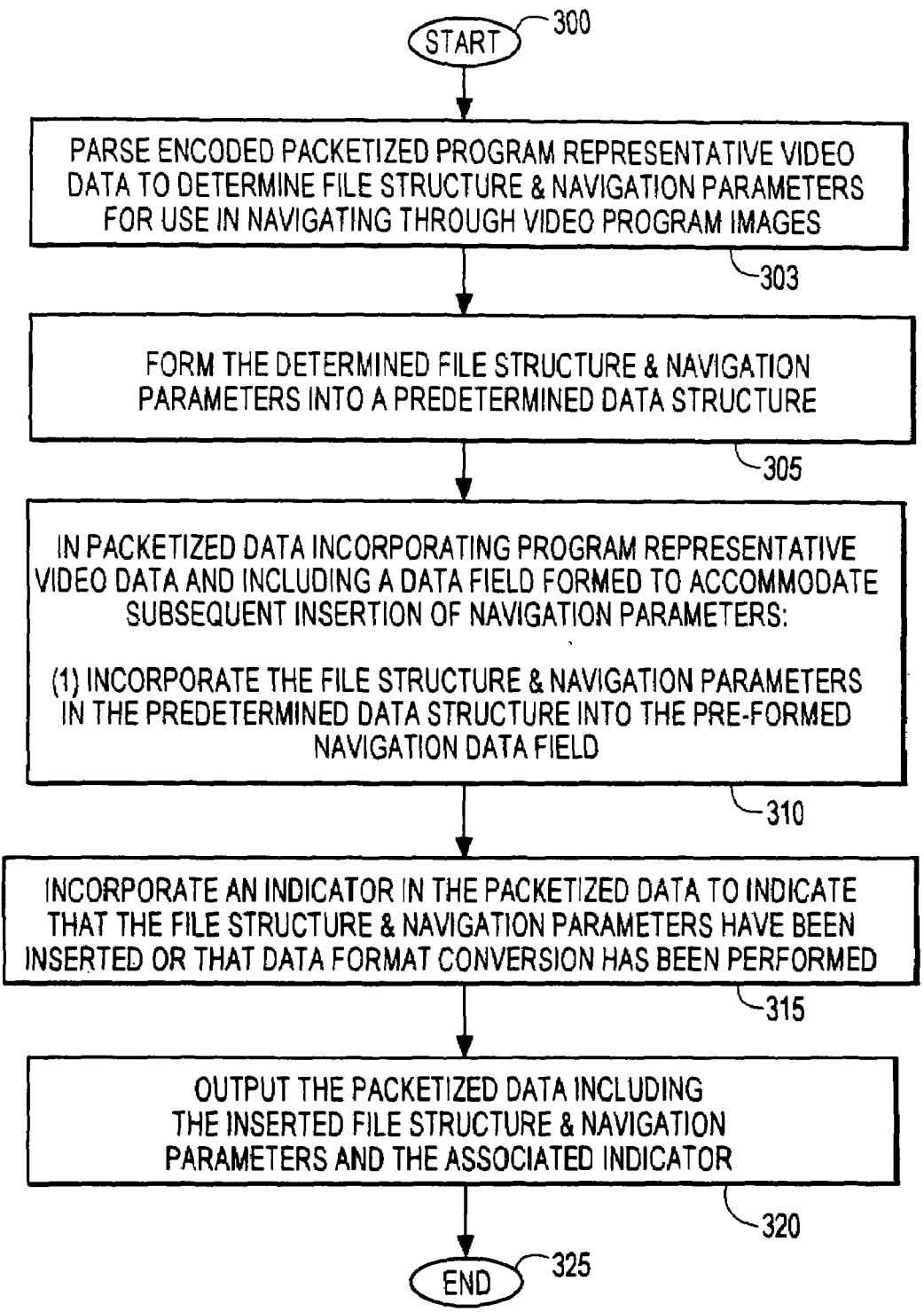
FIG. 7 shows a flowchart for a method for providing volume/file structure and navigation data compatible with different data formats, according to the invention.

FIG. 7 shows a flowchart for a method for providing volume/file structure and navigation data compatible with different data formats. In step 303 following the start at step 300, encoded packetized video data representing a video program is parsed to determine volume/file structure and navigation parameters for use in navigating through a sequence of video images. The parameters may support navigation through images in normal or trick play (e.g. fast forward, reverse, freeze frame etc.). However, the file structure and navigation parameters may also be derived and processed as part of a data format conversion process. The parameters determined in step 303 are formed into a predetermined structure in step 305 and the parameters, as structured, are incorporated into preformed file structure and navigation data fields in packetized video program representative data in step 310. In step 315, an indicator is incorporated into the packetized data to indicate that the file structure and navigation parameters have been inserted and the packetized data, as formed, is output in step 320. The process terminates at step 325.

Figure 8:
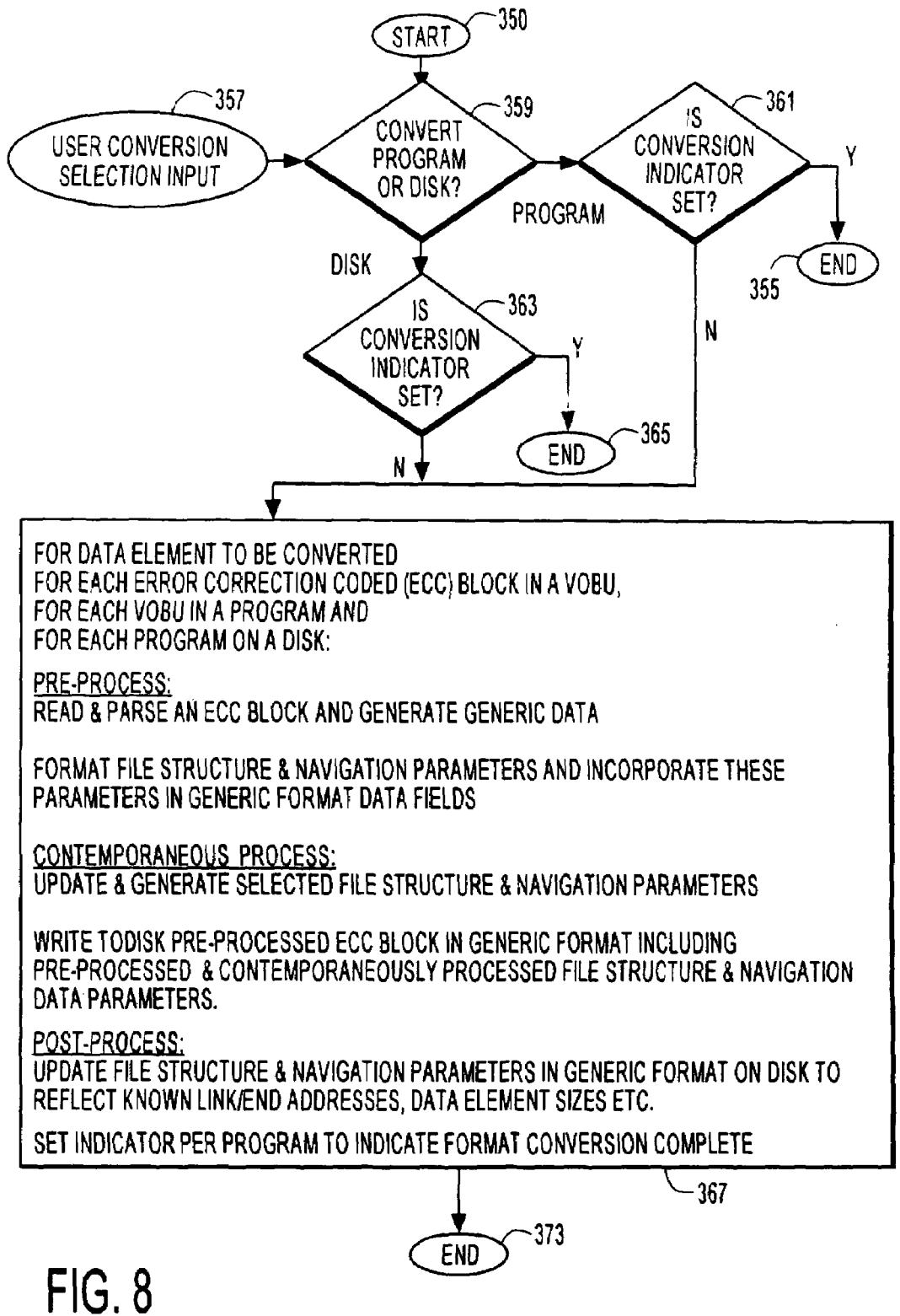
FIG. 8 shows a flowchart for a method for converting image representative digital video data in a read only data format to a different generic data format compatible with read-only and recordable formats, according to the invention.

FIG. 8 shows a flowchart for a method for converting image representative digital video data in a read only data format to a different generic format compatible with read-only and recordable format players. In step 359 following the start at step 350, a user conversion selection input 357 is processed to determine whether an individual program or an entire disk containing one or more programs is to be converted from read-only to generic data format. If conversion of an individual program or an entire disk has been selected, steps 361 and 363 determine respectively whether a conversion indicator has already been set. If the indicator is set, the conversion has already been performed and the process terminates at either step 355 or step 365. If the indicator shows the conversion has not been previously performed, the process for program or disk conversion continues in step 367. Step 367 performs the pre-processing, contemporaneous and post-processing functions for the conversion of read-only file structure, navigation and other data (of FIG. 2) to the generic DVD data format (of FIG. 1) as previously described in connection with FIGS. 3A and 3B.

In the case of conversion of a single program or an entire disk, data is advantageously processed in Error Correction Coded (ECC) block units to simplify processing. In other embodiments, processing may be performed on the basis of different sized data involving correspondingly different memory capacities for the conversion processing. In step 367, ECC blocks in a video object unit (VOBU) are individually processed and this is repeated for each of the VOBUs in the program.

Individual ECC blocks of a program are retrieved from storage and parsed to generate generic format volume, file structure and navigation parameters for incorporation in generic format data fields. Further, in step 367, the pre-processed generic format data is re-stored back to the original disk, either to overwrite the original stored program, or to occupy a different storage area (on the original disk or on a different disk). During the re-storage of the generic format program, selected file structure and navigation parameters are generated or updated as described previously in connection with the contemporaneous mode processing of FIGS. 3A and 3B. In the post-processing function of step 367, the re-stored generic format data produced during the contemporaneous mode is read and parsed to generate consistent file structure and navigation parameters (including addresses, data sizes, location and pointer information as described in connection with FIGS. 3A and 3B). The resultant consistent file structure and navigation parameters are inserted (e.g. by overwriting existing parameters) into their respective generic format data fields in the re-stored generic format program. The data format conversion process of step 367 is completed by updating the data type indicator (e.g. indicator 667 of FIGS. 3A and 3B) to reflect a format change and the process of FIG. 8 terminates at step 373. In converting an entire disk of programs or a plurality of selected programs on a disk, the process described in step 367 is repeated for each of the requisite selected programs.

Figure 9:
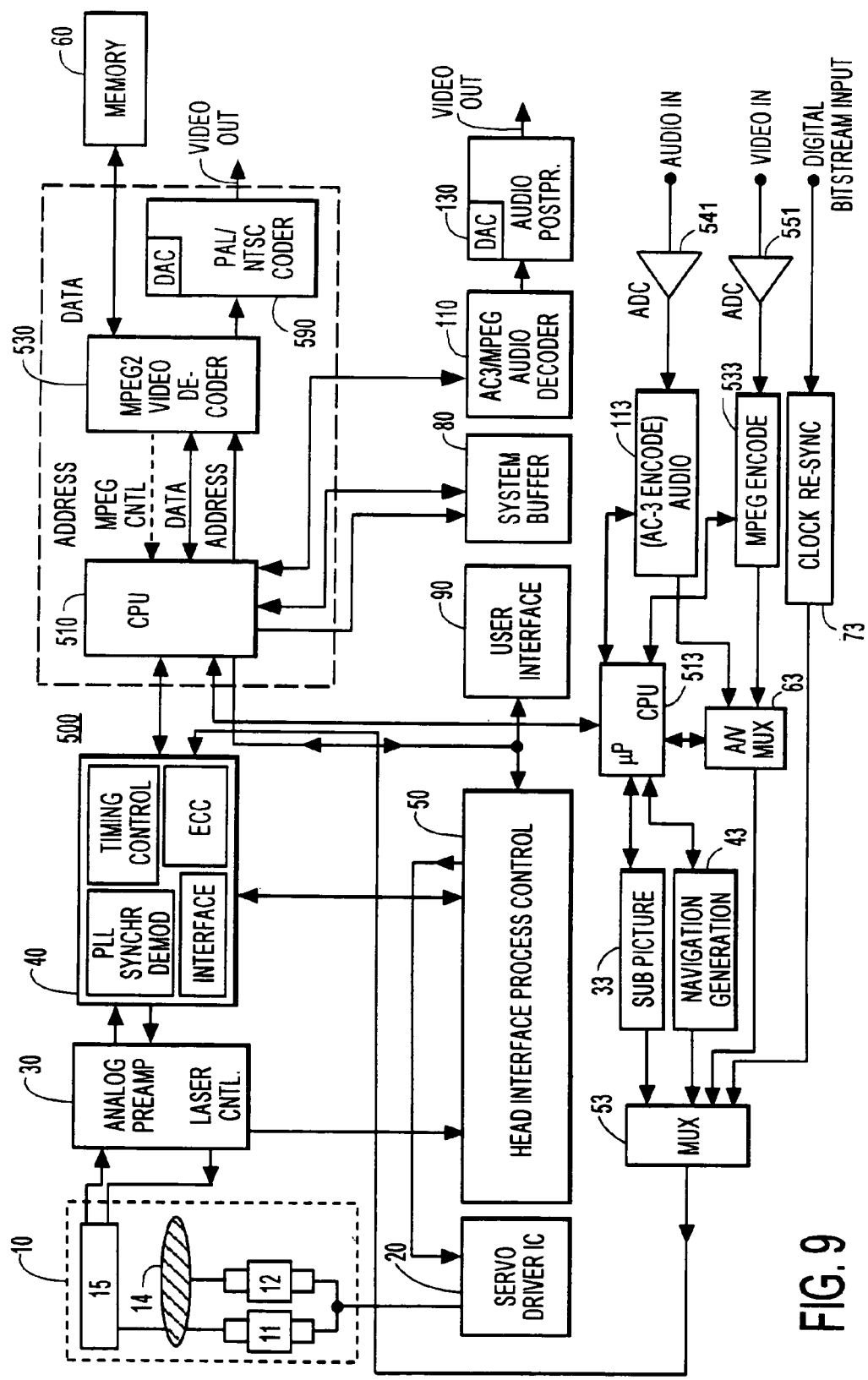
FIG. 9 shows a video decoder and recorder system, according to the invention, for adaptively generating and processing volume/file structure and navigation data for different data formats and for converting data between the formats.

FIG. 9 shows a video decoder and recorder system for adaptively generating and processing volume/file structure and navigation data for different data formats and for converting data between the formats. In block 10 a deck is shown for accommodating disk 14 for rotation by motor 12. A digital signal representing a program is recorded on (and subsequently read from) disk 14 as a spiral track containing pits with respective pit lengths determined by modulation coding responsive to respective signal data bits. In read mode, the program on disk 14 is read by pick up 15 which gathers reflected illumination from a laser. The reflected laser light is collected by a photo detector or opto pick-up device. An imaging device, for example a lens or mirror, which form part of transducer 15, is servo controlled and driven by motor 11 to follow the recorded track. Different parts of the recording may be accessed by rapidly repositioning the imaging device. Servo controlled motors 11 and 12 are driven by integrated circuit drive amplifier 20. Integrated circuit 50 provides drive and control signals for amplifier 20 and servo motors 11 and 12 under direction of controller 510. Transducer 15 is coupled to an opto preamplifier, block 30, which includes drive circuitry for the laser illuminator and a preamplifier which provides amplification and equalization for the reflected signal output from opto transducer device 15. The amplified and equalized replay signal from opto preamplifier 30 is connected to a channel processor block 40 where the replay signal is demodulated following synchronization with a phase locked loop. In record mode, unit 40 encodes, modulates and processes an input digital signal from multiplexer 53 for storage on disk 14 as laser etched pits formed using laser control unit 30 and transducer 15 with respective pit lengths determined by modulation coding representing signal data bits.

In read mode, the digital video disk player is controlled by a central processing unit (CPU) 510 of block 500 in conjunction with memory 80. Unit 510 processes the reproduced bitstream and error flags from channel IC 40 to provide separate video, audio, sub-picture and system control data for output to other units and for internal use. Controller 510 provides MPEG encoded video and audio data to decoder 530 and audio decoder 110 respectively. In addition CPU 510 receives user control commands from user interface 90, and MPEG decoder control functions from the MPEG decoder element 530 of block 500. MPEG decoder 530 uses memory 60 in decoding MPEG encoded video data from unit 510 using variable length coding, discrete cosine transform and quantization functions. Following MPEG or AC3 audio decoding by unit 110, a digitized audio signal results which is coupled to an audio post processor 130 for digital to analog conversion and generation of various base band audio signal outputs. Also, following MPEG video decoding, a digital video output signal from unit 530 is transformed into raster scan format and processed by encoder 590 which provides digital to analog signal conversion and generates baseband video components and encoded video signals for output to a reproduction device.

In record mode, input video and audio datastreams are digitized by analog to digital converters 551 and 541 respectively. The resultant digital video and audio datastreams are MPEG encoded by video encoder 533 and either MPEG or AC3 encoded by audio encoder 113 under direction of controller 513. The functions of controller 513 may, in other embodiments, be encompassed within the functions performed by unit 510. Unit 33 generates sub-picture data (e.g. text, captions, menus etc.) and unit 43 generates file structure and navigation data compatible with the generic format of FIG. 1 under direction of controller 513. The generated sub-picture, file structure and navigation data is incorporated with video and audio encoded data from units 533 and 113 respectively via multiplexers 53 and 63. For this purpose, multiplexer 53 and 63 are controlled by unit 513 in coordination with re-synchronized input timing data provided by unit 73. The encoded multiplexed data from multiplexer 53 is modulated and channel coded and stored on disk 14 via units 40, 30 and 10.

Controllers 510 and 513 control the elements of the record/replay system of FIG. 9 to convert a program stored on disc 14 in read-only format (exemplified in FIG. 2) to generic format (exemplified in FIG. 1). For this purpose, controllers 510 and 513 acquire, parse and collate read-only data from disk 14 and re-format this data into the generic data format (of FIG. 1) for re-storage back to disk 14. Units 510 and 513 achieve this by controlling the elements of the FIG. 9 system in executing the processes of FIGS. 7 and 8 using the pre-processing, contemporaneous and post-processing functions described in connection with FIGS. 3A and 3B.

The architecture of FIG. 9 is not exclusive. Other architectures may be derived in accordance with the principles of the invention to accomplish the same objectives. Further, the functions of the elements of the system of FIG. 9 and the process steps of FIGS. 7 and 8 may be implemented in whole or in part within the programmed instructions of a microprocessor. The pre-processing, contemporaneous and post-processing mode and data conversion principles disclosed herein are applicable to modify the file/navigation data structure or convert the data format of a wide variety of digital data transport structures. Such transport structures, for example, may include NPEG-PSI, JPEG, Internet TCP/IP (Transport Control Protocol/Internet Protocol), DSS (Digital Satellite System), ATM (Asynchronous Transfer Mode) etc. Further, the file/navigation data structure processing principles disclosed here may be applied in other systems, such as in PCs, servers, set-top boxes, other video and audio decoders, HDTV devices and in other data processing devices.

What is claimed is:

1. A method for converting image representative digital video data in a first data format corresponding to a digital disc format to a different second data format corresponding to a second digital disc format in response to initiation of data format conversion, comprising the steps of:

generating navigation parameters to support navigation through a sequence of individual images by parsing encoded packetized data representative of a sequence of individual images in said first data format of said digital disc format, wherein said navigation parameters are derived from at least one of: navigational information related to the sequence of individual images and file structure information of said digital disc format;

incorporating said navigation parameters into a navigation data field; and providing an output comprising packetized data representative of a sequence of individual images in said different second data format including said navigation data field in a different data format of said second digital disc format and a different file structure of said second digital disc format.

2. A method according to claim 1, wherein said step of incorporating said navigation parameters into said navigation data field comprises re-formatting an existing navigation data field with said navigation parameters.

3. A method according to claim 1, wherein
said first data format comprises a read only data format and
said second data format comprises a different recordable data format.

4. A method for converting image representative digital video data of a first data format of a digital disc format to a different second data format of a second digital disc format in response to initiation of data format conversion, comprising the steps of:

parsing encoded packetized data representative of a sequence of individual images in a first data format of said digital disc format to derive parameters to support navigation through said sequence of individual images, wherein the packetized data comprises at least one of: navigation data related to the sequence of individual images and file structure information of said digital disc format;

incorporating said derived parameters into a pre-formed navigation data field; and providing said encoded packetized data and said pre-formed navigation data field as an output in said second data format in at least one of: new navigation data format and new file structure format of said second digital disc format.

5. A method according to claim 4, wherein said derived parameters comprise at least one of, (a) data identifying a group of pictures (GOP) format, (b) a number of GOPs in a video object unit (VOBU), (c) data identifying reference frames in a VOBU or GOP, (d) a start address of image representative data, (e) an end address of image representative data, (f) a parameter identifying size of image representative data, (g) trick play mode selection information and (h) file structure information.

6. A method according to claim 5, wherein
said derived parameters in said navigation data field support navigation through images in at least one of, (a) a frame, (b) a group of pictures (GOP), (c) a video object unit (VOBU), (d) a program, (e) different programs and (f) video data of different MPEG compatible elementary streams.

7. A method according to claim 6, wherein
said different programs comprise a video program and an associated program comprising one of Internet web page data, text data, and program guide data.

8. A method according to claim 6, wherein
said different programs comprise two different video programs.

9. A method according to claim 4, including the step of incorporating an indicator in a datastream including said encoded packetized data and said navigation data field to indicate data format conversion has been performed.

10. A method according to claim 4, wherein
said pre-formed navigation data field comprises a header and a payload and said determined parameters are incorporated in said navigation data field payload.

* * * * *